Oct. 23, 1956
V. J. PINGEL
2,767,438
METHOD AND APPARATUS FOR MAKING
TORQUE-TRANSMITTING ELEMENTS
Filed April 14, 1952
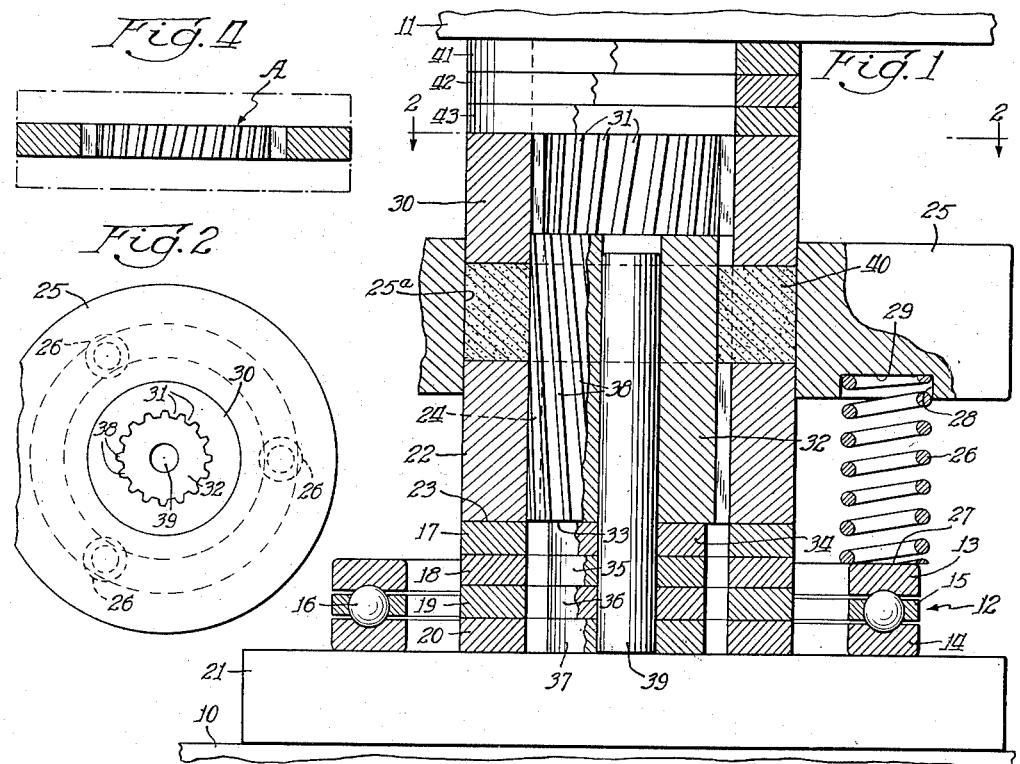
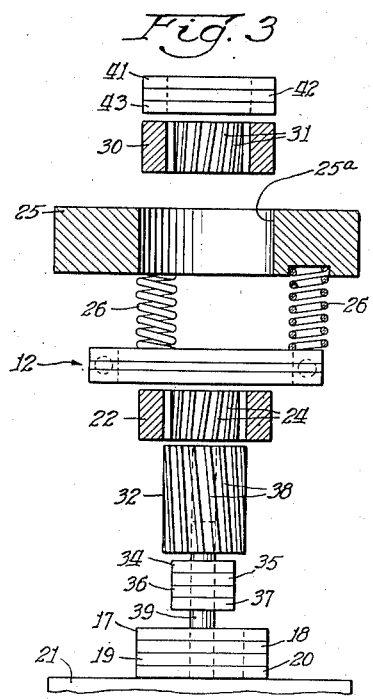
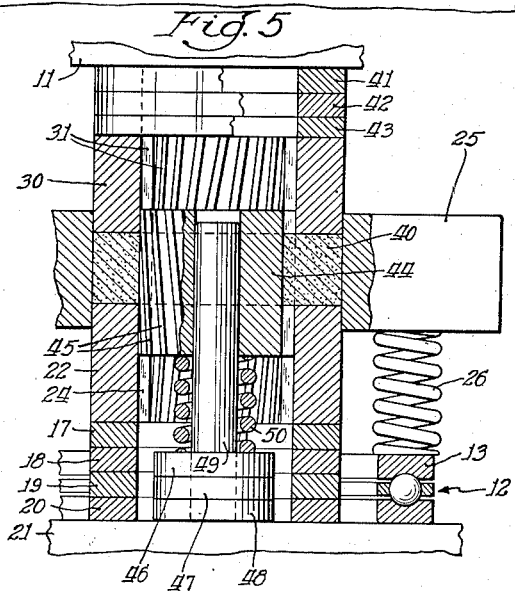
Inventor:
Vernon J. Pingel
By Herbert J. Schmid
Atty.

Patented Oct. 23, 1956

2,767,438

METHOD AND APPARATUS FOR MAKING TORQUE-TRANSMITTING ELEMENTS

Vernon J. Pingel, Arlington Heights, Ill., assignor to Borg-Warner Corporation, Chicago, Ill., a corporation of Illinois Application April 14, 1952, Serial No. 282,185

8 Claims. (Cl. 18—59.3)

This invention relates to torque-transmitting elements and more particularly to rotatable torque-transmitting elements having teeth or splines disposed at angles to the axis of rotation of the elements and to methods and apparatus for making the same.

An object of the invention is to provide methods and apparatus for making torque-transmitting elements of powdered materials, such as metallic or non-metallic powders, each element having teeth or splines disposed at angles to the axis of rotation of the element.

A further object of the invention is to provide methods and apparatus for making torque-transmitting elements, such as gears or shafts, of powdered materials, such as metallic or non-metallic powders, and having internal helical teeth or splines.

The invention further contemplates the provision of new articles of manufacture in the form of torque-transmitting elements, for example, shafts or gears, formed of metallic or non-metallic powders and having internal splines or teeth disposed at angles to the axis of rotation of the elements.

The invention further consists of the novel constructions, arrangements, devices, processes and methods to be hereinafter described and claimed for carrying out the above stated objects and such other objects as will appear from the following description of certain preferred embodiments of apparatus and methods for making the torque-transmitting elements, when taken with reference to the accompanying drawings, wherein:

Figure 1 is a side elevation, partly in section, of apparatus for practicing the method of making a gear of powdered material and having internal helical teeth;

Fig. 2 is a sectional view of the apparatus shown in Fig. 1, said section being taken on line 2—2 of Fig. 1 and looking in the direction of the arrows;

Fig. 3 is an exploded view of the apparatus shown in in Fig. 1;

Fig. 4 is an edge view of a gear formed by the apparatus shown in Figs. 1-4, inclusive, and Fig. 5 is a side elevational view, partly in section, of a modification of the apparatus shown in Figs. 1-4, inclusive.

Referring to the drawings, Figs. 1 to 3, inclusive, illustrate a preferred form of apparatus for practicing the method of making torque-transmitting elements of powdered materials and having teeth or splines disposed at angles to the axis of rotation of the torque-transmitting elements. As an example of such torque-transmitting elements, the element may be a gear shown in Fig. 4 formed of a powdered material which may be a metallic powder, or a non-metallic powder such as plastic composed of any one or more of a large group of organic materials, synthetic or not, that may be molded, for example, the plastic commonly known by the trade name "nylon."

The apparatus is particularly suited for practicing my method of forming torque-transmitting elements in the form of gears composed of compacted powdered materials and having internal helical teeth, such as the gear in Fig. 4 wherein each tooth of the gear is a spiral at any point transverse of the tooth. The apparatus shown in Figs. 1-4, inclusive may be positioned between a stationary bed plate 10 and a vertically reciprocal and non-rotatable loading platen 11 of a hydraulic press capable of exerting large pressures, for example, thirty to forty tons per square inch.

The apparatus more particularly comprises a thrust bearing assembly 12 of conventional form and comprising top and bottom rings 13 and 14 and an intermediate ring 15, the intermediate ring 15 having a plurality of apertures therethrough receiving ball bearings 16 extending within opposed raceways in the rings 13 and 14. The thrust bearing assembly 12 surrounds a plurality of thrust members or washers 17, 18, 19 and 20 in superposed relationship with the bottom washer 20 seated upon a plate 21 engaging the bed plate 10. A cylindrical punch 22 has its lower end seated as at 23 on the washer 17. The punch 22 is provided with a plurality of internal helical teeth or splines 24. An annular die 25 surrounds the upper end of the punch 22 and is supported on three springs 26, the bottom ends of the springs being seated as at 27 on the top ring 13 of the thrust bearing assembly 12 and the upper ends of the springs being received within annular openings or recesses 28 in the die and seated as at 29 against the bottom walls of the recesses in the die, the springs 26 thus yieldably supporting the die 25 on the bearing assembly 12. An annular upper punch 30 is received within the opening in the annular die 25 and is provided with internal helical teeth 31. A core member 32 has its lower end 33 seated upon the top thrust washer 34 of a plurality of thrust washers 34, 35, 36 and 37 in superposed engaged relation and within the washers 17, 18, 19 and 20, the bottom washer 37 being seated on the plate 21. The core member 32 is disposed within the axially aligned openings in the punches 22 and 30 and die 25 and has external helical teeth 38 meshing with the internal teeth of the punches 22 and 30. A guide pin 39 is received within the axially aligned openings in the washers 34, 35, 36 and 37 and core member 32.

The inner cylindrical surface 25a of the die 25 engages the adjacent outer cylindrical surfaces of the punches 22 and 30, as seen in Fig. 1. The die 25 and core member 32 define a matrix within which is disposed a mass of powdered material 40, the top of the punch 22 defining the bottom of the matrix. The powdered material 40 may be of any suitable material such as that previously described. For example, electrolytic iron powder of about 99% purity and —100 mesh and lubricated with 1% zinc stearate, or Swedish sponge iron, as well as other iron or iron alloy powders, have been successfully used in forming gears by my method and apparatus. Between the loading platen 11 and the upper punch 30 are provided a plurality of engaged thrust members or washers 41, 42 and 43, the platen 11 engaging the top thrust member 41 and the bottom thrust member 43 being seated upon the upper end of the top punch 30 as shown.

The assembly shown in Fig. 1 may be disposed between the stationary bed plate 10 and the loading platen 11 of a hydraulic press and pressure, for example, between thirty and forty tons per square inch, is then applied to the assembly by the loading platen 11. During the application of such pressure to the assembly by the loading platen 11, the upper punch 30 will move downwardly and will also rotate, the helical meshing teeth of the punch 30 and the core member 32 requiring the punch 30 to move in a helical direction to cause compression of the powder 40 within the matrix formed by the die 25 and core member 32, and between the punches 30 and 22 and between the teeth 38 of the core member 32. The punch 30 will move relative to the core member 32 until the powder 40 has been compacted tightly against the teeth of the core member and the inner cylindrical surface of the die 25, when the punch 30 and die 25 will rotate as a unit inasmuch as they will be locked up by the compacted powder, and the die 25 and punch 30 as a unit will then rotate and be forced downwardly, the bottom punch 22 rotating with the core member 32 at this time. During this downward and rotary movement of the die 25, the springs 26 will be compressed and will be caused to rotate about the axis of rotation of the assembly, this movement being permitted by the ball bearing assembly 12.

An important feature of the invention is that the engaged bearing surfaces of the thrust washers 17–20, inclusive, 34—37, inclusive, and 41—43, as well as the engaged surfaces of the platen 11 and the thrust member 41, the thrust washer 43 and upper punch 30, the lower punch 22 and washer 17, the thrust member 20 and the plate 21, the washer 34 and core member 32, are ground and polished flat surfaces and are preferably, but not necessarily, lubricated with either oil or graphite. It will be noted that the thrust washers or discs are used to carry the high compression loads and still allow the punches and die to rotate relative to each other in a helical direction.

Further, the engaging bearing surfaces of the thrust washers and the punches 22 and 30, and the core member 32, allows each one of these thrust washers, the punch 22 and core member 32 as a unit, and the punch 30, of the apparatus to rotate relative to one another during the aforesaid operation of the apparatus, the punch 22 and core member 32 rotating as a unit relative to the punch 30 or die 25.

It will be noted that a simulated double action effect takes place upon the aforesaid functioning of the apparatus inasmuch as when the powder 40 has been compressed and compacted between the punches 30, 22 and the die 25 and core member 32, the powder will be forced inwardly between the teeth or splines 38 of the core member 32 so that the punch 30, core member 32, and the die 25 will be locked up and rotate as a unit, the die 25 being forced downwardly. The ball thrust bearing assembly 12 will function to take the light loads of the spring-suspended die 25 while allowing the die to rotate as a double action pressing effect, made possible by the springs 26, takes place. In view of the considerable pressure applied to the powdered material 40, the powder will be compacted and compressed to substantially one-third of its original height shown in dotted lines in Fig. 4, to provide the gear A having internal helical teeth T each having a left helix, due to the fact that the helices of the teeth or splines 38 of the core member 32 are also left helices. It is believed apparent that, if the teeth 31 of the punch 30, the teeth 24 of the punch 22 and the teeth 38 of the core member 32 are right helices, a gear will be formed with teeth of right helix. The guide pin 39 is instrumental in aligning the washers 34–37 with the opening in the core member 32.

Fig. 5 illustrates a modification of the apparatus shown in Figs. 1 to 3, inclusive, similar reference numerals being used to identify like parts of the apparatus shown in Figs. 1–3 and Fig. 5. The apparatus comprises a thrust ball bearing assembly 12, core member 44 having external helical teeth 45 meshing with interial helical teeth 31 of punch 30 and also meshing with internal helical teeth 38 of punch 22. The die 25 and core member 44 define a matrix within which is disposed iron powder 40, the lower punch 22 defining the bottom of the matrix. Positioned between the loading platen 11 and the upper punch 30 are the thrust discs 41, 42 and 43. A plurality of thrust washers 17, 18, 19 and 20 are in superposed relation and positioned above the plate 21, the bottom washer 20 engaging the plate 21 and the top washer 17 engaging the punch 22. Positioned within the openings in the thrust washers 46, 47 and 48 and within the centrally located opening of the core member 44 is a guide pin 49, the bottom end of the pin being seated on the plate 21.

A spring 50 surrounds the pin 49, having its lower end seated on the thrust washer 46 and its upper end engaged with and yieldably supporting the core member 44. Three helical springs 26 support the die 25 on the thrust bearing assembly 12, the upper ends of the springs being seated against the die 25 and the bottom ends of the springs being seated upon the annular member 13 of the ball bearing assembly 12.

All of the engaged surfaces of the thrust discs 41, 42 and 43, the engaged surfaces of the thrust washers 17, 18, 19 and 20 and the engaged surfaces of the thrust washers 46, 47 and 48, as well as the engaged surfaces of the thrust disc 41 and platen 11, the engaged surfaces of the thrust disc 43 and punch 30, as well as the engaged surfaces of the thrust washer 17 and punch 22, plate 21 and thrust washers 20 and 48 are ground and polished flat surfaces preferably, but not necessarily, provided with lubricants, such as oil or graphite.

Upon downward movement of the platen 11 of the hydraulic press to exert a pressure between thirty and forty tons per square inch on the apparatus, a simulated double action will be had on the die 25 and the core member 44 caused by the friction of the compressed powder 40 when the powder is compressed. More particularly, as the punch 30 moves downwardly, it will compress the powder 40 in the matrix, the punch 30 moving downwardly and rotating as it will follow a helical path provided by the intermeshing of the helical teeth 31 of the punch 30 and the helical teeth 45 of the core member 44. When the powder compresses tightly against the teeth 45 of the core member 44 and the cylindrical internal side of the die 25, the tightly compacted powder will cause the die 25, punch 30 and core member 44 to rotate and move downwardly as a unit. Due to the action of the spring 50, the core member 44 will resist the frictional effect of the compacted powder on the core member tending to move the core member downwardly and the core member will cause the spring to be only slightly compressed until at such time when the powder has compacted against the core member to an extent setting up sufficient friction to cause the core member to move downwardly and further compress the spring 50. When the die 25 is moved downwardly, the springs 26 will resist such downward movement of the die, while the bearing assembly 12 will permit rotation of the die 25 and springs 26. However, as the powder 40 is more firmly compacted, the friction exerted by the powder on the inner face 25a of the die will cause the die to move downwardly to compress the springs 26 permitting downward movement of the die. Due to the fact that all of the engaging surfaces of the thrust discs and washers are lubricated, the thrust washers or discs will carry the high compression load and still allow the punch 30 and core member 44 to rotate in a helical direction, the bottom punch 22 being also capable of rotation. The ball thrust bearing assembly 12 is used to take the light loads of the spring-suspended die 25 and allows the die to turn as the double-action pressing effect, made possible by the springs 50 and 26, takes place. The thrust washers and discs, as well as the punches, are allowed to move relative to one another so that should the friction become sufficiently great to cause conjoint rotative movement of any two of the elements of the apparatus, there will be insufficient friction between two other elements to prevent relative rotative movement thereof when such movement becomes necessary. Due to the variations in the friction conditions encountered from one element to another element of the apparatus, it is difficult to state exactly which parts rotate at specific instances during downward movement of the platen 11. The apparatus illustrated in Fig. 5 will produce the gear such as shown in Fig. 4, the powder being compacted to substantially one-third its height in order to provide the gear A.

It may be noted that there is a synchronizing action inherent in the structural characteristics of the different parts of the assembly as, in the movements of the punches and core member, the core member may follow one or the other of the punches, or vice versa, i. e. if one or the other of the punches binds with the core member due to friction, then the core member will rotate, or vice versa.

In the two apparatus in Figs. 1–4, and Fig. 5, it is difficult to state exactly which of these elements rotate at specific instances because of the variations in frictional conditions that are encountered from each element to another element, but it has been clearly proven by experiment that should one element bind with relation to another element, due to frictional conditions, the engaged surfaces of other elements having the lowest friction will move, when movement becomes necessary (the punch 22 and core member 32 rotating as a unit in Figs. 1–4, but the core member 44 and punch 22 bearing relative rotation in Fig. 5). It may be noted that a synchronizing action of the elements of the assembly is inherent in the structural characteristics of either apparatus as in Figs. 1–4 the die, the punch 30 and the core member may move and rotate indiscriminately relative to each other, and in Fig. 5, the punches and core member may move and rotate indiscriminately relative to each other, as, if one pair of engaged bearing surfaces of any of the elements of the apparatus should bind, due to friction, another pair of engaged surfaces will permit rotation of their elements relative to each other. No separate and external mechanism is therefore required to obtain a synchronizing action of the apparatus.

In the two described and illustrated apparatus, the punches 30 and 22, as well as the core member are shown as having meshing helical teeth of left helix. However, it will be clearly apparent that right helix teeth may be used to produce a gear having teeth of right helix.

In either of the apparatus shown in Figs. 1–3 and Fig. 5, the gear is removed from the apparatus by raising the platen 11, by forcing the die down over the bottom punch with a forked yoke engaging the top of the die, until the top surface of the die is level with the top surface of the lower punch; thereafter, the gear A with the core member as a unit can be removed by the operator; the unit then being placed in a fixture permitting relative rotational movement of the gear and core member during separation of the latter by relative axial movement.

It is to be understood that while I have shown methods and apparatus for forming torque-transmitting elements having helical teeth, it will be apparent that a torque-transmitting element, such as a spur gear, having straight teeth at angles to the axis of the element may be made by providing the punches and core member with such teeth. Furthermore, the thickness and diameter of the elements may be varied by the utilizing core members and punches suitable for the desired thickness and diameter of the elements. It is also believed to be readily apparent that, if a hydraulic press having reciprocal upper and lower platens movable toward each other and providing a double action effect on the apparatus is used, it is unnecessary that springs 26 in Figs. 1–3, inclusive, or the springs 26 and 50 in the apparatus shown in Fig. 5 be utilized as will be apparent to those skilled in the art.

I claim:

1. Apparatus for making a hollow torque-transmitting element of compressed powdered material and having internal teeth each disposed at an angle to the axis of rotation of the element comprising axially spaced and aligned annular members having outer cylindrical surfaces, a core member within said members, and a die element surrounding and engaging said outer surfaces of said spaced members and defining therewith and with said core member a cavity for the reception of powdered material, said core member having external teeth meshing with internal teeth on said spaced members and also defining the inner boundary of said cavity, the teeth of said members being disposed at angles to the common axis of said members; means for moving said spaced members toward each other to compress the powdered material in said cavity to form the torque-transmitting element; and means disposed between, and engaged by, said moving means and said spaced members to allow relative rotation of said spaced members during operation of said moving means.

2. Apparatus for making a torque-transmitting element of compressed powdered material and having internal teeth each disposed at an angle to the axis of rotation of the element comprising axially spaced and aligned annular members, a core member, and a die element surrounding and engaging said spaced members and defining therewith and with said core member a cavity for the reception of powdered material, said core member having external teeth meshing with internal teeth on said spaced members and also defining the inner boundary of said cavity, the teeth of said members being disposed at angles to the common axis of said members; means for moving said spaced members toward each other to compress the powdered material in said cavity to form the torque-transmitting element; a plurality of thrust elements disposed between said moving means and each of said spaced members and between said core member and said moving means and having engaged bearing surfaces to allow relative rotation of said spaced members such rotation being controlled solely by the intermeshing teeth of said members during operation of said moving means; and means supporting said die element for rotation about the common axis of said members.

3. Apparatus for making a hollow torque-transmitting element of compressed powdered material and having internal teeth each disposed at an angle to the axis of rotation of the element comprising axially spaced and aligned annular members, a core member within said members, and an annular die element surrounding and engaging said spaced members and defining therewith and with said core member a cavity for the reception of powdered material, said core member having external teeth meshing with internal teeth on said spaced members and also defining the inner boundary of said cavity, the teeth of said members being disposed at angles to the common axis of said members; means for moving said spaced members toward each other to compress the powdered material in said cavity to form the torque-transmitting element; and means disposed between, and engaged by, said moving means and said members to allow relative rotation for said members such rotation being controlled solely by their intermeshing teeth during operation of said moving means; and means supporting said die element for rotation about the common axis of said members.

4. Apparatus for making a torque-transmitting element of compressed powdered material and having internal teeth each disposed at an angle to the axis of rotation of the element comprising an assembly of axially spaced and aligned annular punch members having outer cylindrical surfaces, a core member, and a die element surrounding and engaging said surfaces of said spaced members and defining therewith and with said core member a cavity for the reception of powdered material, said core member having external teeth meshing with internal teeth on said spaced punch members, the teeth of said members being disposed at angles to the common axis of said members; a press having parts movable relative to each other along the axis of said members of said assembly for moving said spaced punch members toward each other to compress the powdered material in said cavity to form the torque-transmitting element; and means for mounting said assembly between said press parts and allowing rotation of said members of the assembly relative to each other and said press parts said rotation being controlled solely by the intermeshing teeth of said members during operation of said press.

5. Apparatus for making a torque-transmitting element of compressed powdered material and having internal teeth each disposed at an angle to the axis of rotation of the element comprising axially spaced and aligned annular members having outer cylindrical surfaces, a core member, and a die element axially spaced from said annular members surrounding and engaging said surfaces of said spaced members and defining therewith and with said core member an annular cavity for the reception of powdered material, said core member having external teeth meshing with internal teeth on said spaced members and also defining the inner boundary of said annular cavity, the teeth of said members being disposed at angles to the common axis of said members; means for moving said spaced members toward each other to compress the powdered material in said cavity to form the torque-transmitting element and means for mounting said annular members and said core member for rotation with respect to each other and the moving means, said rotation being controlled solely by the intermeshing teeth of said members.

6. Apparatus for making a gear of compressed powder and having internal teeth disposed at an angle to the gear axis comprising axially spaced and aligned annular members, an annular core member and a die element defining with said spaced members and said core member a cavity for the reception of powder and having external teeth meshing with internal teeth on said spaced members and defining the inner limit of said cavity, said teeth being disposed at angles to their common axis, means for moving said spaced members toward each other to compress the powder; a plurality of thrust elements disposed between said moving means and each of said spaced members and between said moving means and said core member and having engaged bearing surfaces to allow relative rotation of said spaced members controlled solely by their intermeshing teeth during operation of said moving means; anti-friction means engaging said moving means and resilient means supporting said die element on said anti-friction means.

7. Apparatus for making a gear of compressed powder and having internal teeth disposed at an angle to the gear axis comprising axially spaced and aligned annular members, an annular core member and a die element defining with said spaced members and said core member a cavity for the reception of powder and having external teeth meshing with internal teeth on said spaced members and defining the inner limit of said cavity, said teeth being disposed at angles to their common axis, means for moving said spaced members toward each other to compress the powder; a plurality of flat washers disposed between said moving means and each of said spaced members and between said moving means and said core member and having engaged bearing surfaces to allow relative rotation of said spaced members controlled solely by their intermeshing teeth during operation of said moving means; anti-friction means engaging said moving means and resilient means supporting said die element on said anti-friction means.

8. Apparatus for making a gear of compressed powder and having internal teeth disposed at an angle to the gear axis comprising axially spaced and aligned annular members, an annular core member and a die element defining with said spaced members and said core member a cavity for the reception of powder and having external teeth meshing with internal teeth on said spaced members and defining the inner limit of said cavity, said teeth being disposed at angles to their common axis, means for moving said spaced members toward each other to compress the powder; a plurality of thrust elements disposed between said moving means and each of said spaced members and between said moving means and said core member and having engaged bearing surfaces to allow relative rotation of said spaced members controlled solely by their intermeshing teeth during operation of said moving means; anti-friction means engaging said moving means; resilient means supporting said die element on said anti-friction means and reslient means supporting said core element on said thrust elements.

References Cited in the file of this patent

UNITED STATES PATENTS

| | | |
|---|---|---|
| 1,959,612 | Burke | May 22, 1934 |
| 2,307,874 | Bilde | Jan. 12, 1943 |
| 2,447,434 | Schwarzkopf | Aug. 17, 1948 |
| 2,561,735 | Haller | July 24, 1951 |